United States Patent [19]

Glance

[11] Patent Number: 5,493,625

[45] Date of Patent: Feb. 20, 1996

[54] FAST TUNABLE CHANNEL DROPPING FILTER

[75] Inventor: Bernard Glance, Colts Neck, N.J.

[73] Assignee: AT&T Corp., Murray Hill, N.J.

[21] Appl. No.: 153,523

[22] Filed: Nov. 16, 1993

[51] Int. Cl.$^6$ ................................ G02B 6/24; G02B 6/28
[52] U.S. Cl. ................................ 385/24; 385/14; 385/16; 385/20; 385/39; 385/40; 385/41; 385/42; 385/46; 359/115; 359/117; 359/124; 359/127; 359/128
[58] Field of Search .................................. 385/2, 8, 9, 14, 385/15, 16, 17, 20, 24, 25, 39, 40, 41, 42, 46, 48; 359/890, 114, 115, 117, 118, 120, 124, 126, 127, 128, 154, 164

[56] References Cited

U.S. PATENT DOCUMENTS

| | | | |
|---|---|---|---|
| 4,673,270 | 6/1987 | Gordon | 385/42 X |
| 5,002,350 | 3/1991 | Dragone | 385/24 |
| 5,093,876 | 3/1992 | Henry et al. | 385/28 |
| 5,136,671 | 8/1992 | Dragone | 385/46 |
| 5,233,453 | 8/1993 | Sivarajan et al. | 385/24 X |
| 5,309,534 | 5/1994 | Cohen et al. | 385/27 |
| 5,339,157 | 8/1994 | Glance et al. | 385/24 |

*Primary Examiner*—Brian Healy
*Attorney, Agent, or Firm*—Stuart H. Mayer

[57] ABSTRACT

A channel dropping filter includes three frequency routing devices, one which functions as an input device and two which function as output devices. The first frequency routing device has one input for receiving the input signal and at least N outputs, where N corresponds to the number of frequencies that compose the input signal. The N outputs of the first frequency routing device are each coupled to an optical switch. Each optical switch has a first output coupled in consecutive order to one of the N inputs of the first output frequency routing device and a second output coupled in consecutive order to one of the N inputs of the second output frequency routing device. A controller is employed to selectively switch the optical switches between first and second states for directing each optical frequency component demultiplexed by the first frequency routing device to the first and second output frequency routing device, respectively.

12 Claims, 4 Drawing Sheets

FAST TUNABLE CHANNEL DROPPING FILTER

CROSS-REFERENCE TO RELATED APPLICATIONS

This application is related to application Ser. No. 19,961, now U.S. Pat. No. 5,339,157, of Bernard Glance and Robert Wilson, entitled "Rapidly Tunable Integrated Optical Filter", filed on Feb. 19, 1993.

This application is related to application Ser. No. 19,957, pending, of Bernard Glance and Robert Wilson, entitled "Rapidly Tunable Wideband Integrated Optical Filter", filed on Feb. 19, 1993.

This application is related to application Ser. No. 19,951, now U.S. Pat. No. 5,373,516, of Bernard Glance and Robert Wilson, entitled "Rapidly Tunable Wideband Integrated Laser", filed on Feb. 19, 1993.

This application is related to application Ser. No. 19,952, now U.S. Pat. No. 5,373,517, of Corrado Dragone and Ivan Kaminow, entitled "Rapidly Tunable Integrated Laser", filed on Feb. 19, 1993.

This application is related to application Ser. No. 08/152,511, now U.S. Pat. No. 5,425,116, of Corrado Dragone, Martin Zirngibl, and Mark Kuznetsov, entitled "Tunable Optical Waveguide Grating Arrangement," filed on the same day as this application is being filed.

This application is related to application Ser. No. 138,659, pending, of Bernard Glance and Robert Wilson entitled "Optical Passband Filter," filed on Oct. 18, 1993.

This application is related to application Ser. No. 152,571, pending, of Bernard Glance entitled "Optical Filter Having Integrated Transceivers", filed on the same day as this application is being filed.

TECHNICAL FIELD

This invention relates to optical communications systems. More particularly, this invention relates to a fast tunable channel dropping filter used in optical communications systems.

BACKGROUND

The capacity and speed of communications systems may be increased by transmitting information in optical form over networks composed of optically transmissive nodes, fibers, and the like. High capacity optical communications systems require that many optical signals be frequency division multiplexed in the components of an optical network. Receivers must be configured such that a desired optical frequency or band of frequencies may be retrieved from a group of many optical frequencies. This necessitates the provision of suitable optical filters such as a tunable channel dropping filter for dividing out one or more component frequencies from a multiplexed signal composed of a large number of frequencies. Until now, there has been no convenient approach to dividing out one or more optical frequencies with an extremely rapid response time.

SUMMARY

In accordance with this invention, a fast optical tunable channel dropping filter has been developed. The optical filter in accordance with this invention may be based upon photonic integrated circuitry which can provide very sharp transitions between the various passbands.

In one example of the invention, Applicants have realized that integrated optical multiplexers and demultiplexers disclosed, for example, in U.S. Pat. Nos. 5,002,350 and 5,136,67 may be used to create a monolithic optical tunable channel dropping filter. In specific terms, this example of the invention comprises three frequency routing devices, one which functions as an input device and two which function as output devices. The first frequency routing device has one input for receiving the input signal and at least N outputs, where N corresponds to the number of frequencies that compose the input signal. The N outputs of the first frequency routing device are each coupled to an optical switch. Each optical switch has a first output coupled in consecutive order to one of the N inputs of the first output frequency routing device and a second output coupled in consecutive order to one of the N inputs of the second output frequency routing device. A controller is employed to selectively switch the optical switches between first and second states for directing each optical frequency component demultiplexed by the first frequency routing device to the first and second output frequency routing device, respectively.

In another example of the invention, the filter employs only two frequency output devices. Specifically, the input frequency routing device has an input for receiving a signal composed of a plurality of multiplexed optical frequencies and a plurality of outputs. The output frequency routing device has a plurality of inputs and at least two outputs. Each of the outputs of the input frequency routing device corresponds in a consecutive order to one of the inputs of the output frequency routing device. A switch is employed for selectively directing demultiplexed optical frequency components of the signal from each of the outputs of the input frequency routing device to either the corresponding input of the output muting device or an input of the output routing device adjacent to the corresponding input. As a result, the plurality of multiplexed optical frequencies is arranged into at least two multiplexed output signals which are each directed to a different one of the outputs of the output frequency routing device. In particular, those frequency components directed to the corresponding input will be directed to a first output waveguide of the output frequency routing device while those frequency components directed to the adjacent input will be directed to a second output waveguide of the output frequency routing device.

In this second example of the invention the mechanism employed for directing the frequency components to the appropriate input of the output frequency routing device may be composed of a plurality of waveguides, optical switches and optical couplers. Each waveguide connects one of the outputs of the input device to the corresponding input of the output device through an optical switch and an optical coupler are arranged in series with each of the waveguides. The optical switch directs the demultiplexed frequency component to the optical coupler and the input waveguide of the output device in series therewith. Alternatively, the optical switch directs the demultiplexed frequency component to the adjacent optical coupler and the adjacent input waveguide of the output device.

These are only two examples of the invention. The full scope of the invention entitled to an exclusionary right is set forth in the claims at the end of this application.

DETAILED DESCRIPTION

Figure 1:
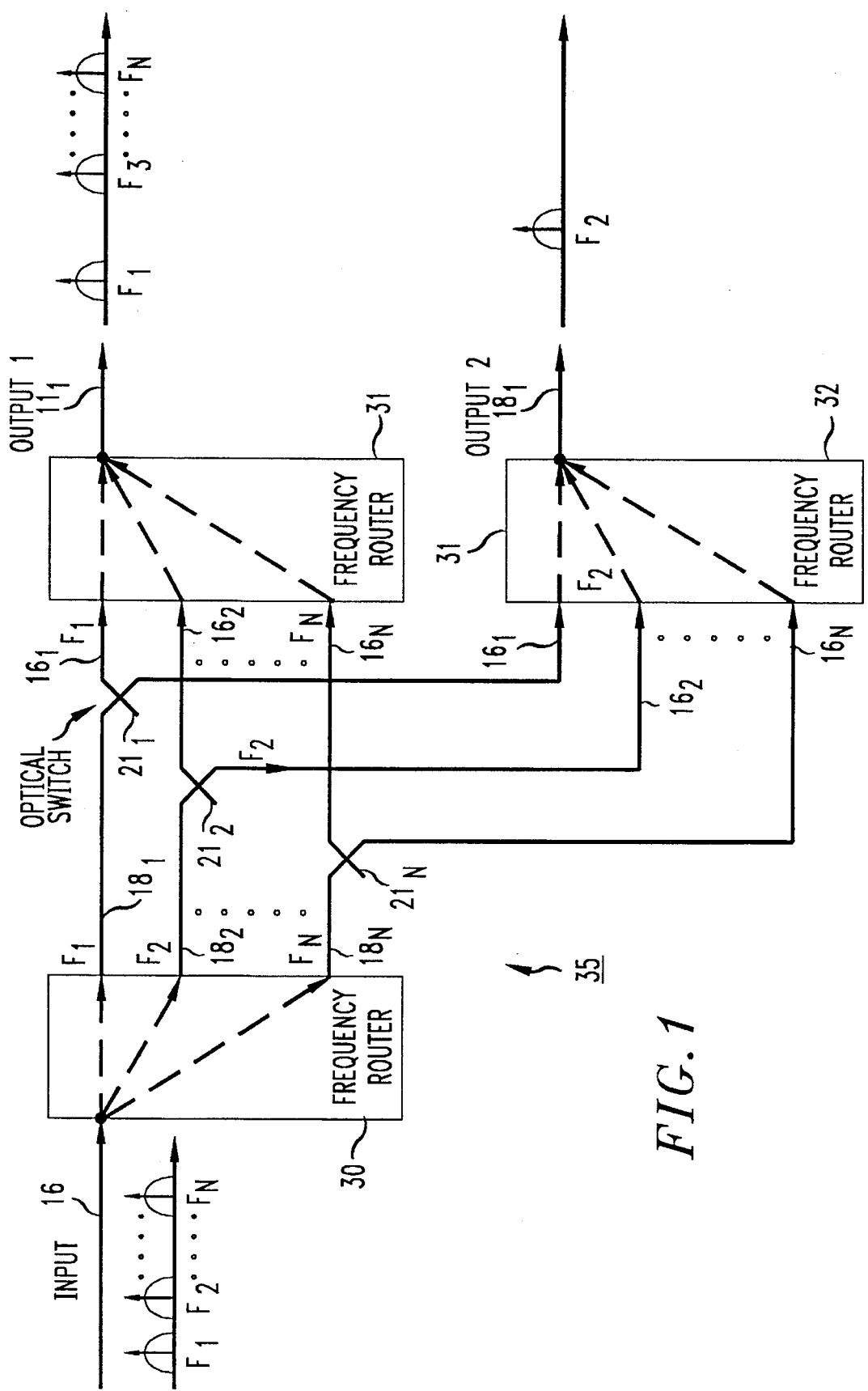
FIG. 1 is a diagram of an example of an optical tunable channel dropping filter in accordance with this invention.

FIG. 1 shows an example of the tunable channel dropping filter of the present invention. It is composed of three frequency routing devices 30, 31 and 32 coupled by waveguides and optical switches. These structures may be monolithically integrated on a semiconductive wafer. They may be created by known photolithographic techniques.

The frequency routing devices employed in the present invention operate as multiplexers and demultiplexers of optical frequencies. The details of their construction and operation are more fully described in U.S. Pat. Nos. 5,002,350 and 5,136,671 to Dragone, the entire contents of which are hereby incorporated by reference into this application. Before the tunable filter of the present invention is described, the pertinent features of the frequency routing devices will be reviewed.

FIGS. 2(a) and (b) show a functional illustration of a routing device 12 of the type employed in the present invention. In general, the routing device may have N input waveguides and M output waveguides to form an N×M frequency routing device. For example, the routing device 12 shown in FIG. 1(a) has four input waveguides $16_1$, $16_2$, $16_3$, $16_4$, and four output waveguides $18_1$, $18_2$, $18_3$, $18_4$. In general, for a frequency routing device of a given design, the output waveguide to which a particular frequency component will be directed is a function of the frequency and the particular input waveguide to which the frequency component is directed. The routing device 12 can be configured to demultiplex preselected input optical frequencies directed to any of its input waveguides. For example, as seen in FIG. 2(a), if a multiplexed signal composed of preselected frequencies $F_1$, $F_2$, $F_3$, $F_4$, is directed to the first input waveguide $16_1$ of the routing device 12, frequency $F_1$ will be directed to output waveguide $18_1$, frequency $F_2$ will be directed to output waveguide $18_2$, frequency $F_3$ will be directed to output waveguide $18_3$, and frequency $F_4$ will be directed to output waveguide $18_4$. The details of constructing an appropriate frequency routing device for demultiplexing and multiplexing a series of preselected frequency components is disclosed in the above-referenced patents.

FIG. 2(b) illustrates the manner in which the optical signal is demultiplexed by the frequency routing device seen in FIG. 2(a) if it is directed to the second input waveguide $16_2$ rather than the first input waveguide $16_1$. In this case frequency $F_1$ will be directed to output waveguide $18_2$, frequency $F_2$ will be directed to output waveguide $18_3$, frequency $F_3$ will be directed to output waveguide $18_4$, and frequency $F_4$ will be directed back up to output waveguide $18_1$ since the routing device 12 only has four output waveguides. If the routing device 12 is provided with a fifth output waveguide $18_5$ (shown in dashed lines in FIG. 2(b)) to form a 4×5 routing device, frequency $F_4$ will appear on this fifth output waveguide instead of on the first output waveguide $18_1$.

The routing devices discussed above are symmetrical in operation. For example, assuming the routing device shown in FIG. 2(a) is a 5×5 routing device, if frequencies $F_1$, $F_2$, $F_3$, $F_4$ are directed to waveguides $18_1$, $18_2$, $18_4$, and $18_5$, respectively (which now function as input waveguides), frequencies $F_1$ and $F_2$ will be output on waveguide $16_1$ and frequencies $F_3$ and $F_4$ will be output on waveguide $16_2$.

Figure 2:
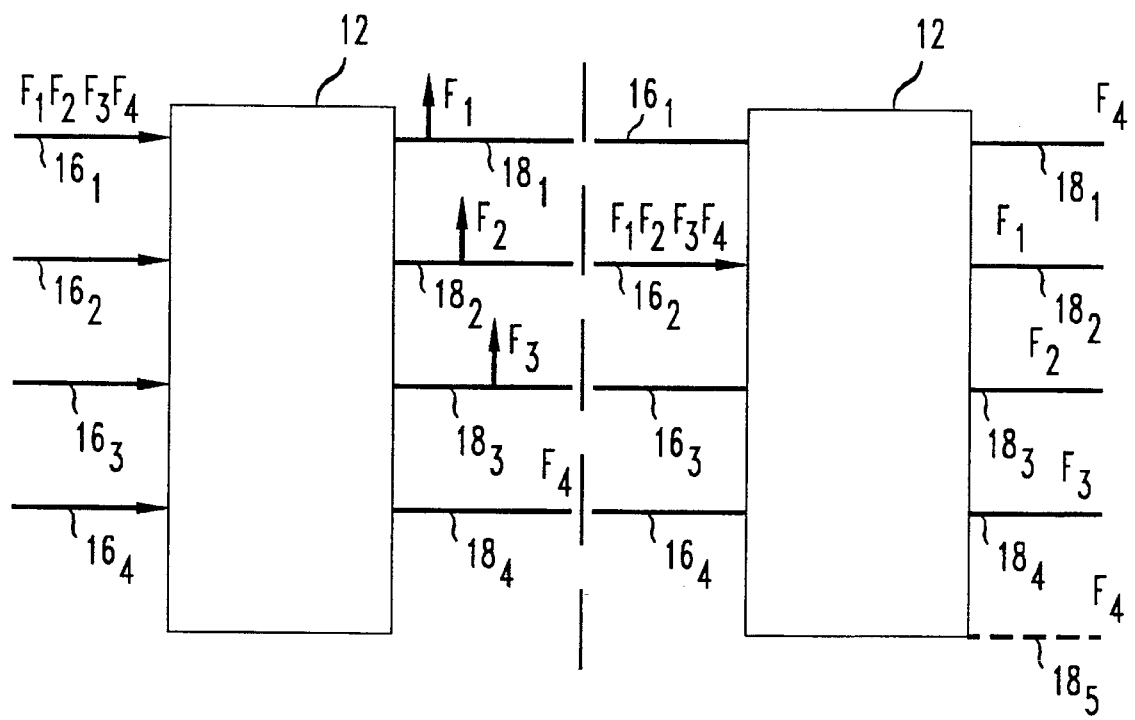
FIGS. 2(a) and 2(b) are diagrams of the frequency routing devices employed in the optical channel dropping filter of this invention.

A general property of the frequency routing device seen in FIG. 2, which is configured to demultiplex and multiplex a given set of frequency components, is suggested by FIGS. 1 and 2. Specifically, if an optical signal is directed to any selected input waveguide $16_i$, the first frequency component of the signal will appear on output waveguide $18_i$. Subsequent frequency components will appear on the successive output waveguides (i.e., the second frequency component will appear on output waveguide $18_{(i+1)}$, the third frequency component will appear on output waveguide $18_{(i+2)}$, etc.).

Returning to FIG. 1, the tunable channel dropping filter 35 of the present invention is composed of three frequency routing devices 30, 31 and 32. The first routing device 30 in which the input signal is directed is a 1×N routing device, where N is the number of frequencies contained in the multiplexed input signal. The second and third routing devices 31 and 32 are each N×1 routing devices. The N output waveguides $18_1$, $18_2$, ..., $18_N$ of the first routing device 30 are each coupled to an optical switch $21_1$, $21_2$, ..., $21_N$, respectively. Each optical switch has two outputs. The first output of the switches $21_1$, $21_2$, ..., $21_N$ are connected to the inputs $16_1$, $16_2$, ..., $16_N$, respectively, of the second routing device 31. Similarly, the second output of the switches $21_1$, $21_2$, ..., $21_N$ are connected to the inputs $16_1$, $16_2$, ..., respectively, of the third routing device 32. In other words, for each optical switch $21_i$, where $1 \leq i \leq N$, its first output is coupled to input waveguide $16_i$ of the second routing device 31 and its second output is coupled to input waveguide $16_i$ of the third routing device 32. Accordingly, the signal that is input to the optical switch from the first routing device 30 will be ultimately directed to the output of either the second routing device 31 or the third routing device 32 based on the state of the switch. Such optical switches and the corresponding control means are known devices and hence will not be discussed further. The tunable channel dropping filter 35 operates as follows. A multiplexed signal composed of frequencies $F_1$, $F_2$, ..., $F_N$ is input to the first frequency routing device 30. The first routing device 30 demultiplexes the input signal so that each frequency $F_i$ is directed to output waveguide $18_i$. Depending on the states of the individual optical switches, each frequency $F_i$ will be directed to the input waveguide $16_i$ of either the second or third routing device 31 or 32. In particular, if optical switch $21_i$ is in a first state, frequency $F_i$ will be directed to input waveguide $16_i$ of the second routing device 31. Alternatively, if optical switch $21_i$ is in a second state, frequency $F_i$ will be directed to input waveguide $16_i$ of the third routing device 32.

Those individual frequencies $F_i$ which are directed to the corresponding inputs $16_i$ of the second routing device 31 will be multiplexed so that a single multiplexed signal is directed to the output waveguide 181 of the second routing device 31. Similarly, those individual frequencies $F_j$ which are directed to the corresponding inputs $16_j$ of the third routing device 32 will be multiplexed so that a single multiplexed signal is directed to the output waveguide $18_1$ of the third routing device 32. Accordingly, a multiplexed signal directed to the input of the filter 35 has its individual frequency components directed to one of two output waveguides in accordance with the state of the optical switch through which each frequency component must pass.

Each optical switch $21_1$, $22_2$, ..., $22_N$ can be switched between states independently of the remaining optical switches by employing appropriate control means. As a result, the frequency components of the optical input signal can be divided between the two output waveguides in any manner desired. For example, in FIG. 1 optical switches $21_1$, $21_3$, ..., and $21_N$ are in a first state so that frequencies $F_1$, $F_3$, ..., $F_N$ are directed as a multiplexed signal to the output waveguide $18_1$ of the second routing device 31. Optical switch $21_2$ is in a second state and thus frequency $F_2$ is directed to the output waveguide $18_1$ of the third routing device 32. As a result of the particular combination of optical switch states that were chosen for this example, the multiplexed output signal directed to output waveguide $18_1$ of the second frequency routing device 31 corresponds to the input signal except that one frequency or channel (i.e., frequency $F_2$) has been dropped from the signal.

Figure 3:
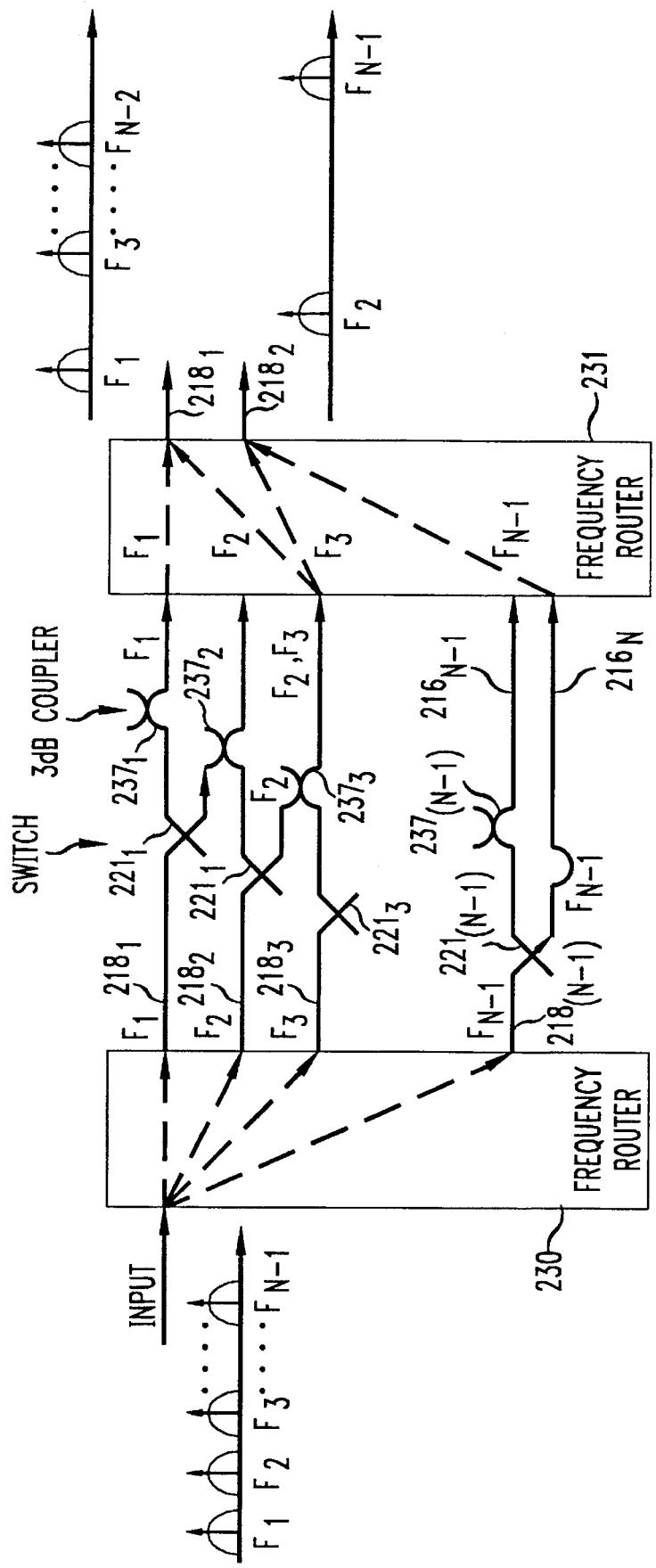
FIG. 3 is a diagram of an alternative example of an optical tunable channel dropping filter in accordance with this invention.

FIG. 3 shows an alterative example of the invention which requires only two frequency routing devices but which employs both optical switches and optical couplers. As with the first example of the invention, these components may be all monolithically integrated on a single semiconductive wafer. In this case the first routing device 230 is a 1×(N−1) routing device and the second routing device 231 is an N×2 routing device. To reduce the complexity of the filter, it may be advantageous to employ a first routing device that also has N outputs (i.e., a 1×N frequency routing device) where the Nth output waveguide is unused. The output waveguides $218_1, 218_2, \ldots, 218_{(N-1)}$ of the first routing device 230 are connected to the optical switches $221_1, 221_2, \ldots, 221_{(N-1)}$, respectively. In this case the first output $218_i$ of each optical switch $221_i$ is connected to the input waveguide $216_i$ of the second routing device 231 via an optical coupler $237_i$ such as a 3 dB optical coupler which is inserted in series with the input waveguide $216_i$. The second output of each optical switch $221_i$ is connected to the input waveguide $216_{(i+1)}$ of the second routing device 231 via the optical coupler $237_{(i+1)}$ that is in series with the input waveguide $216_{(i+1)}$. In other words, each output waveguide of the first routing device is coupled in consecutive order to the corresponding input of the second routing device via the first output of the optical switch in series therewith. Each output waveguide of the first routing device is also coupled in consecutive order to the subsequent or adjacent input of the second routing device via the second output of the optical switch in series therewith.

The example of the tunable channel dropping filter 235 shown in FIG. 3 operates as follows. The multiplexed signal composed of frequencies $F_1, F_2, \ldots, F_{(N-1)}$ is demultiplexed by the first frequency routing device 230 so that each frequency $F_i$ is directed to output waveguide $218_i$. Depending on the states of the individual optical switches, each frequency $F_i$ will be directed to either input waveguide $216_i$ or adjacent input waveguide $216_{(i+1)}$ of the second routing device 231 through the optical couplers. In particular, if optical switch $221_i$ is in a first state, frequency $F_i$ will be directed to input waveguide $216_i$ of the second routing device 231. Alteratively, if optical switch $221_i$ is in a second state, frequency $F_i$ will be directed to input waveguide $216_{(i+1)}$ of the second routing device 231.

Those individual frequencies $F_i$ which are directed to the corresponding inputs $216_i$ of the second routing device 231 will be multiplexed by the second routing device 231 so that a single multiplexed signal is directed to the first output waveguide $218_1$ of the second routing device 231. However, as a result of the general property of the frequency routing device discussed above, those individual frequencies $F_j$ appearing on output waveguides $218_j$ of the first routing device 230 which are directed to the adjacent inputs $216_{(j+1)}$ of the second routing device 231 will be multiplexed by the second routing device 231 so that a single multiplexed signal is directed to the second output waveguide $218_2$ of the second routing device 231. Accordingly, just as with the example of the filter 35 shown in FIG. 1, a multiplexed signal directed to the input of the filter 235 shown in FIG. 3 has its individual frequency components directed to one of two output waveguides in accordance with the state of the optical switch through which each frequency component must pass.

In FIG. 3, optical switches $221_1, 221_3, \ldots 221_{(N-2)}$ are all shown in a first state so that frequencies $F_1, F_3, \ldots, F_{(N-2)}$ are directed as a multiplexed signal to the output waveguide $218_1$ of the second routing device 231. Optical switches $221_2$ and $221_{(N-1)}$ are in a second state and thus frequencies $F_2$ and $F_{(N-1)}$ are directed to the output waveguide $218_2$ of the second routing device 231. As a result of the particular combination of optical switch states that were chosen for this example, the multiplexed output signal directed to output waveguide $218_1$ of the second frequency routing device 231 corresponds to the input signal except that two frequencies or channels (i.e., frequencies $F_2$ and $F_{(N-1)}$ have been dropped from the signal.

Figure 4:
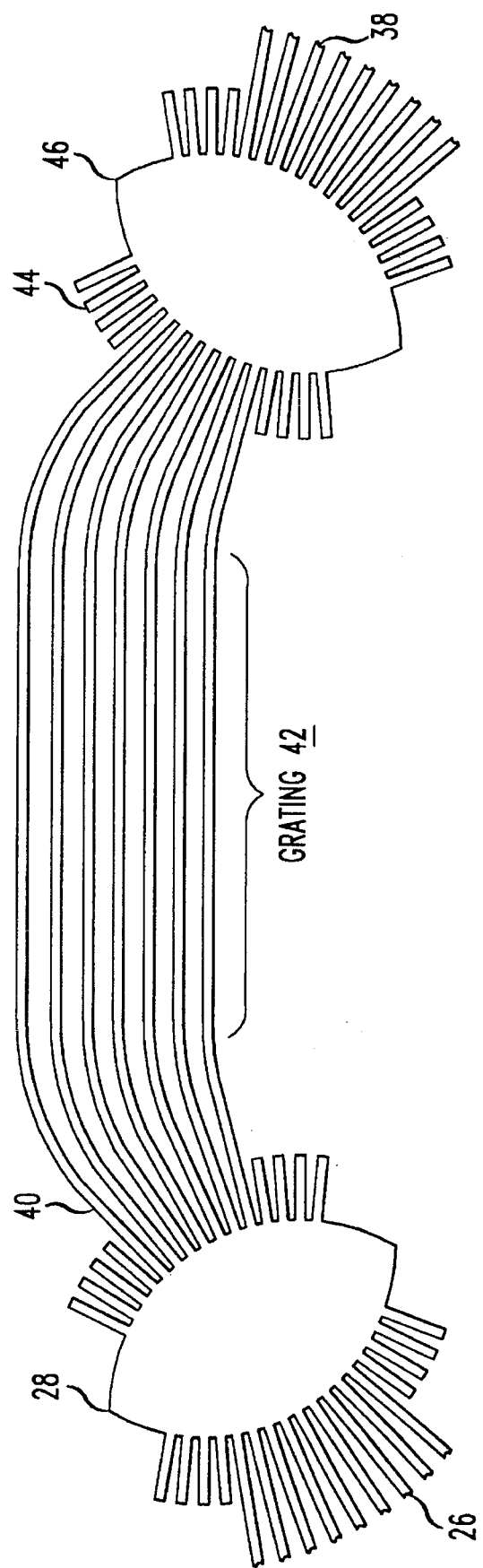
FIG. 4 is a diagram illustrating the details of the frequency routing devices shown in FIG. 2.

FIG. 4 shows the pertinent details of the frequency routing devices employed in the invention. All of these devices may have identical configurations except for, possibly, the differing numbers of input and output waveguides that are employed. Each frequency routing device contains a plurality of input waveguides 26 connected to a free space region 28. A plurality of output waveguides 40 extends from the free space region 28 and is connected to an optical grating 42. The optical grating 42 comprises a plurality of unequal length waveguides which provides a predetermined amount of path length difference to a corresponding plurality of input waveguides 44 connected to another free space region 46. The free space region 46 is connected to a plurality of output waveguides 38. These frequency routing devices operate as multiplexers and demultiplexers of optical frequencies. As noted above, details of their construction and operation are more fully described in the U.S. Pat. No. 5,136,671 to Dragone. In the case of the frequency routing device 30 seen in FIG. 1, the input waveguide 16 corresponds to one of the input waveguides 26 shown in FIG. 4. In the case of the frequency routing device 31 seen in FIG. 1, the output waveguide $18_1$ corresponds to one of the output waveguides 38 shown in FIG. 4. Similarly, in the case of the frequency routing device 32 seen in FIG. 1, the output waveguide $18_1$ corresponds to one of the output waveguides 38 shown in FIG. 4. The example of the filter shown in FIG. 3 employs the frequency routing device shown in FIG. 4 in a manner similar to that discussed in connection with the filter shown in FIG. 1.

I claim:

1. An optical channel dropping filter comprising:
   an input frequency routing device having an input for receiving a signal composed of a plurality of multiplexed optical frequencies; and
   at least first and second output frequency routing devices responsive to the input frequency routing device, the first and second output frequency routing devices having respective first and second outputs, the first output carrying at least one of the multiplexed optical frequencies and the second output carrying the remainder of the optical frequencies.

2. The filter of claim 1 further comprising means for selectively directing demultiplexed optical frequency components of the plurality of multiplexed optical frequencies from the input frequency routing device to an input of either the first or second output frequency routing device.

3. The filter of claim 1 wherein said input frequency routing device has at least N outputs, N>1, each for receiving a demultiplexed optical frequency component of the plurality of multiplexed optical frequencies, and further comprising:

at least N optical switches each coupled to one of said outputs of the input frequency routing device, said optical switches each having a first output coupled in consecutive order to one of N inputs of the first output frequency routing device and each having a second output coupled in consecutive order to one of N inputs of the second output frequency routing device.

4. The filter of claim 3 further comprising control means for selectively switching the optical switches between first and second states for directing each demultiplexed optical frequency component to the first and second output frequency routing device, respectively.

5. The filter of claim 4 wherein said control means switches the state of each of said optical switches independently of every other optical switch.

6. A tunable optical filter comprising:

an input frequency routing device having an input for receiving a signal composed of a plurality of multiplexed optical frequencies, the input frequency routing device further having at least one output;

an output frequency routing device having at least two outputs; and means for selectively directing demultiplexed optical frequency components of the plurality of multiplexed optical frequencies from the at least one output of the input frequency routing device to either a first input of the output routing device or a second input of the output routing device.

7. The filter of claim 6 wherein said directing means comprises:

a waveguide connecting the at least one output of the input device to the first input of the output device; and an optical switch and an optical coupler arranged in series with the waveguide.

8. The filter of claim 7 wherein the optical coupler optically couples the output of the input frequency routing device in series therewith to both the first and second inputs of the output device.

9. The filter of claim 6 wherein the input frequency muting device has a second output and the output frequency device has a third input, and further comprising: means for selectively directing demultiplexed optical frequency components of the plurality of multiplexed optical frequencies from the second output of the input frequency routing device to either the second input of the output routing device or the third input of the output routing device.

10. The filter of claim 9 wherein said directing means comprises:

a second waveguide connecting the second output of the input device to the second input of the output device; and a second optical switch and a second optical coupler arranged in series with the second waveguide.

11. The filter of claim 10 wherein the second optical coupler optically couples the second output of the input frequency routing device in series therewith to both the second and third inputs of the output device.

12. An optical channel dropping filter comprising:

an input frequency routing device having an input for receiving a signal composed of a plurality of multiplexed optical frequencies;

at least first and second output frequency routing devices responsive to the input frequency routing device, the first and second output frequency routing devices having respective first and second outputs, the first output carrying at least one of the multiplexed optical frequencies and the second output carrying at least a portion of the remaining optical frequencies; and means for selectively directing demultiplexed optical frequency components of the plurality of multiplexed optical frequencies from the input frequency routing device to an input of either the first or second output frequency routing device.

* * * * *